(12) United States Patent  
Garcia et al.

(10) Patent No.: US 9,385,987 B2  
(45) Date of Patent: *Jul. 5, 2016

(54) CONTROLLING NOTIFICATION BASED ON POWER EXPENSE AND SOCIAL FACTORS

(71) Applicant: Facebook, Inc., Menlo Park, CA (US)

(72) Inventors: David Harry Garcia, Sunnyvale, CA (US); Michael John McKenzie Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,131

(22) Filed: Nov. 3, 2015

(65) Prior Publication Data

US 2016/0057097 A1 Feb. 25, 2016

Related U.S. Application Data

(63) Continuation of application No. 14/294,501, filed on Jun. 3, 2014, now Pat. No. 9,270,633, which is a continuation of application No. 13/289,894, filed on Nov. 4, 2011, now Pat. No. 8,751,592.

(51) Int. Cl.
| | |
|---|---|
| *G06F 15/16* | (2006.01) |
| *H04L 12/58* | (2006.01) |
| *G06Q 50/00* | (2012.01) |
| *H04L 29/08* | (2006.01) |

(52) U.S. Cl.  
CPC .............. *H04L 51/32* (2013.01); *G06Q 50/01* (2013.01); *H04L 51/14* (2013.01); *H04L 51/38* (2013.01); *H04L 67/306* (2013.01); *H04L 51/20* (2013.01)

(58) Field of Classification Search  
None  
See application file for complete search history.

(56) References Cited

FOREIGN PATENT DOCUMENTS

| | | |
|---|---|---|
| JP | H04-22236 | 1/1992 |
| JP | H10-22908 | 1/1998 |
| JP | 2005-165697 | 6/2005 |
| JP | 2007-221448 | 8/2007 |
| JP | 2008-546285 | 12/2008 |
| JP | 2009-181386 | 8/2009 |

OTHER PUBLICATIONS

Notification of Reason for Rejection for JP 2015-211748, Jan. 26, 2016.

*Primary Examiner* — Dustin Nguyen  
(74) *Attorney, Agent, or Firm* — Baker Botts L.L.P.

(57) ABSTRACT

In one embodiment, a computer system determines a wireless transmit cost for each of one or more outgoing messages for a first user, and transmits to the first user's mobile device at least one of the one or more outgoing messages based on the mobile device's power state and respective wireless transmit costs of the one or more outgoing messages.

20 Claims, 4 Drawing Sheets

CONTROLLING NOTIFICATION BASED ON POWER EXPENSE AND SOCIAL FACTORS

RELATED APPLICATIONS

This application is a continuation under 35 U.S.C. §120 of U.S. patent application Ser. No. 14/294,501, filed 3 Jun. 2014 and issued as U.S. Pat. No. 9,270,633, which is a continuation under 35 U.S.C. §120 of U.S. patent application Ser. No. 13/289,894, filed 4 Nov. 2011 and issued as U.S. Pat. No. 8,751,592, each of which is incorporated herein by reference.

TECHNICAL FIELD

This disclosure generally relates to data transmission.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system.

The social networking system may transmit contents and messages related to its services to a user's client device over a network. A network can be the Internet, a corporate intranet, a virtual private network, a local area network, a wireless local area network, a wide area network, a metropolitan area network, or a combination of two or more such networks.

DETAILED DESCRIPTION

Figure 1:
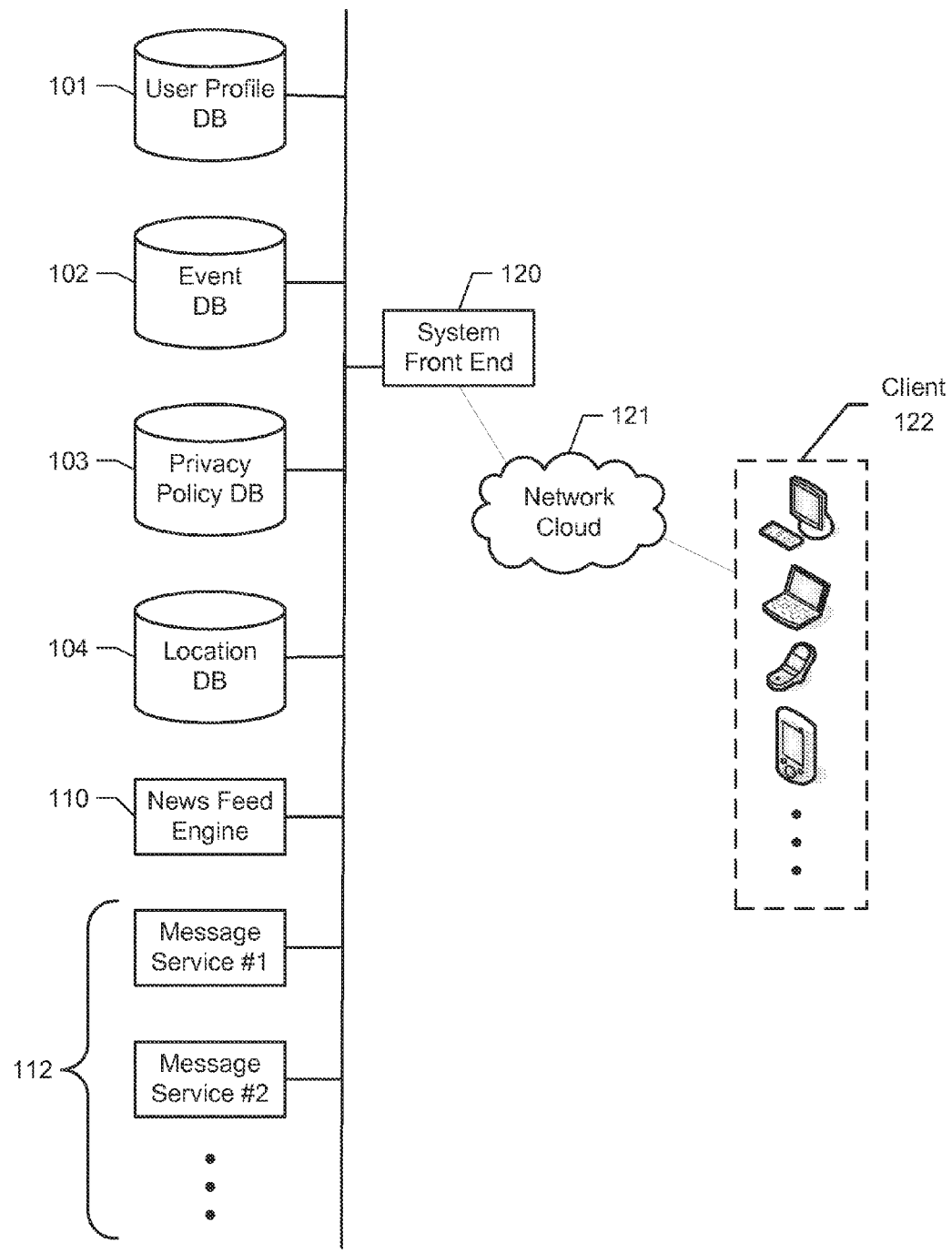
FIG. 1 illustrates an example social networking system.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

The social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, filed 19 Apr. 2010 and issued as U.S. Pat. No. 8,244,848, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011 and issued as U.S. Pat. No. 9,083,747, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events related to users within a threshold degree of separation of a subject user, and/or updates to pages that a user has liked or otherwise established a subscriber relationship. Individual users of the social networking system may subscribe to specific news feeds of their interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120 and news feed engine 110. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, one or more web pages associated with the place and corresponding links to the one or more web pages, and the like). Places may be created by administrators of the system and/or created by users of the system. For example, a user may register a new place by accessing a client application to define a place name and provide a geographic location and cause the newly created place to be registered in location database 104. As described in U.S. patent application Ser. No. 12/763,171, information about a created place may be stored in a hub node in a social graph, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, news feed engine 110 may access user profile database 101, event database 102, and location database 104 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, and location database 104 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

In response to a user's request to load or refresh a web page for the social networking system, the social networking system may transmit one or more news items or news feed entries generated by news feed engine 110 to the user's client device 122, causing an application (e.g., a web browser) running on the user's client device 122 to display the one or more news feed entries in the application's user interface. The social networking system may initiate and transmit (or push) one or more news feed entries to a user's client device 122. For example, the social networking system may periodically accessing news feed engine 110 for one or more news feed entries that have not been consumed by a user, and transmit the one or more news feed entries to the user's client device 122. For example, news feed engine 110 may generate a news feed entry for a user (e.g., a news feed entry about an event just created by the user's roommate), causing the social networking system to transmit the news feed entry to the user's client device 122.

In addition to a news item or news feed entry, the social networking system may transmit other types of messages to a user. For example and without limitation, a messages can be an email, an instant message (IM), an Short Message Service (SMS) message, an Multimedia Messaging Service (MMS) message, an advertisement, a system update message, or any combinations of those. The social networking system may also transmit to a user an message or notification indicating a request to establish a real-time communication session (e.g., a phone call, a video call).

A mobile device (e.g., a mobile phone, a tablet computer) often runs solely on its battery. With abundance of messages (such as described above) available for a user to consume at the user's mobile device, it is desirable to manage message transmission to the user's mobile device in order to conserve the mobile device's battery power. Meanwhile, it may not be of high importance to manage message transmission to the user's mobile device if the mobile device is currently plugged in to a wall outlet (i.e., the mobile device's battery is being charged). Particular embodiments herein describe methods of managing transmission of outgoing messages for a user based on a transmit cost associated with each outgoing message. For example, particular embodiments can access a pool of outgoing messages for a user, and calculate a transmit cost (e.g., in energy consumption) for each message in the pool of outgoing messages based on a size (e.g., in bytes) of the each message. For example, particular embodiments can transmit one or more outgoing messages with the lowest transmit costs (e.g., smallest in sizes) to the user first, and store the rest of outgoing messages from the pool of outgoing messages in a queue for later transmission.

Figure 2:
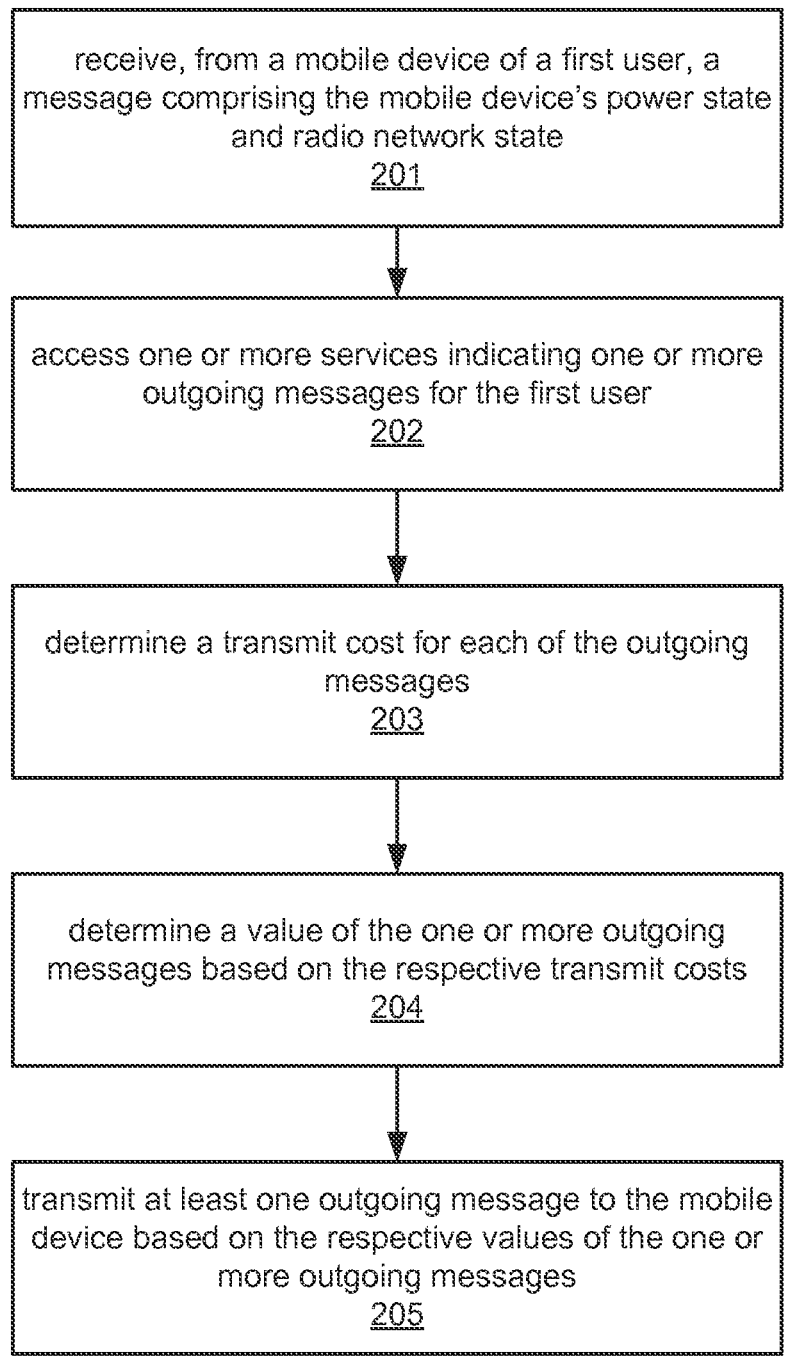
FIG. 2 illustrates an example method of managing transmission of outgoing messages for a user based on a transmit cost associated with each outgoing message

FIG. 2 illustrates an example method of managing transmission of outgoing messages for a user based on a transmit cost associated with each outgoing message. The example method of FIG. 2 can be implemented by a notification manager process hosted by one or more computing devices of the social networking system. In particular embodiments, the notification manager process may receive, from a mobile device of a first user, a first message comprising the mobile device's power state and radio network state (201). A mobile device can be a mobile phone, a tablet computer, a laptop computer, a handheld game console, an electronic book reader, or any other suitable portable devices. In particular embodiments, the power state may indicate a level of energy available in the mobile device's battery (e.g., measured in percentage such as 75% charged, or measured in an absolute value such as 900 mAh). In particular embodiments, the power state may indicate whether the mobile device's battery is being charged. In particular embodiment, the radio network state may comprise one or more radio networks that the mobile device is currently connected to (e.g., a WI-FI network, a Global System for Mobile Communications or GSM cellular network, a Long Term Evolution or LTE network). In particular embodiments, the radio network state may further comprise an indication of signal strength of the current radio network connection (e.g., measured in dBm, or in a relative term such as 4 out of 5 bars). For example, a special-purpose client application (or a background process) running on one or more processors of the first user's mobile device may periodically access device drivers of the mobile device's battery and radio communication subsystem and transmit to social networking system a message including the mobile device's power state and radio network state. For example, the special-purpose client application (or the background process) may detect a change in the mobile device's radio network state (e.g., changing from a WI-FI network connection to a cellular network connection) and/or a change in the mobile device's power state (e.g., changing from a first state of 20% charged to a second stat of being charged currently), and transmit to the social networking system a message updating the mobile device's power state and/or radio network state.

In particular embodiments, the notification manager process may access one or more services indicating one or more outgoing messages for the first user (202). In particular embodiments, the notification manager process may access one or more message services 112 operably connected to the social networking system (as illustrated in FIG. 1) for information of one or more outgoing messages for the first user. For example, message service 112 can be one or more computing devices configured to deliver messages to users of the social networking system For example and without limitation, an outgoing message can be a news item or news feed entry, an email, an IM, an SMS message, an MMS message, an advertisement, a system update message, a notification for a request to establish a real-time communication session, or any combination of those as described earlier. In particular embodiments, information of an outgoing message for the first user may comprise one or more identifiers (e.g., a user name, a phone number, an email address) of the outgoing message's originator, and a size (e.g., in bytes) of the outgoing message.

In particular embodiments, the notification manager process may determine a transmit cost for each of the outgoing messages (203). In particular embodiments, the notification manager process may determine a transmit cost in energy consumption by the mobile device for receiving an outgoing message based on a size of the outgoing message and the mobile device's current radio network state. For example, the notification manager process can calculate a first energy consumption number (e.g., in mA) by the mobile device for receiving the outgoing message itself by multiplying a radio power consumption number of a radio transceiver of the mobile device (e.g., in mA/s) by a size (e.g., in bytes) of the outgoing message and a bandwidth (e.g., in bytes/s) of a radio network that the mobile device is connected to. The notification manager process can calculate a second energy consumption number (e.g., in mA) by the mobile device for establishing a wireless communication session for receiving the outgoing message by multiplying the radio power consumption number (e.g., in mA/s) by a time duration (e.g., in seconds) of establishing the wireless communication session (e.g., including power-up and power-down of the radio transceiver). For example, the notification manager process can determine a transmit cost in energy consumption by a summation of the first energy consumption number and the second energy consumption number. The radio power consumption number and the bandwidth described above may depend on the mobile device's model and/or the radio network that the mobile device is connected to. The notification manager process can access a data store for values for the radio power consumption number and the bandwidth of the radio network (e.g., provided by a wireless communication carrier and/or a device manufacturer).

In some embodiments, the notification manager process may adjust the transmit cost in energy consumption based on a signal strength of the current radio network connection. For example, a radio network connection of a weaker signal strength (e.g., 1 out of 5 bars) may have a lower effective bandwidth due to dropped packets. For example, the notification manager process may adjust the transmit cost in energy consumption by adjusting the first energy consumption number described above with a lower bandwidth value, and/or adjusting the second energy consumption number described above with a longer time duration for establishing the wireless communication session.

In particular embodiments, the notification manager process may determine a value of the one or more outgoing messages. In particular embodiments, the notification manager process may determine a value of the one or more outgoing messages based on respective transmit costs of the one or more outgoing messages (204). For example, the notification manager process can prioritize the outgoing messages by assigning a priority score of 1.0 to an outgoing message if the outgoing message has a transmit cost in energy consumption of less than 100 mA·s, 0.8 if the outgoing message has a transmit cost in energy consumption of between 100 and 500 mA·s, 0.5 if the outgoing message has a transmit cost in energy consumption of between 500 and 1000 mA·s, and 0.2 if the outgoing message has a transmit cost in energy consumption of more than 1000 mA·s.

In particular embodiments, the notification manager process may determine a value of the one or more outgoing messages further based on an affinity between each of the one or more outgoing messages and the first user—i.e., based on an affinity between each outgoing message's originator and the first user. For example, the notification manager process may assign each of the one or more outgoing messages an affinity coefficient. For example, the notification manager process can assign an affinity coefficient of 1.0 to an outgoing message if the outgoing message's originator is the first user's immediate family members (e.g., parents, siblings), or an affinity coefficient of 0.9 if the outgoing message's originator frequently communicates with the first user, or an affinity coefficient of 0.7 if the outgoing message's originator is the first user's first-degree social contact. Interactions between users on social networking system, such as chats, wall posts, emails, and the like, can also be used in scoring affinities between users. A system for measuring user affinity is described more generally in U.S. patent application Ser. No. 11/503,093, filed on Aug. 11, 2006, which is hereby incorporated by reference in its entirety and for all purposes. In particular embodiments, the notification manager process may adjust a priority score of an outgoing message based on an affinity coefficient of the outgoing message. For example, the notification manager process can adjust a priority score of an outgoing message by multiplying the priority score with the outgoing message's affinity coefficient.

In one embodiment, the notification manager process may determine a value of the one or more outgoing messages based on a type of the one or more outgoing messages. For example, the notification manager process can assign a priority score of 1.0 for a request for establishing a phone call session, 0.8 for an SMS message or an IM message, 0.6 for a news feed entry, 0.4 for an email message, and 0.2 for all other types of messages.

In particular embodiments, the notification manager process may transmit at least one outgoing message to the mobile device based on respective values of the one or more outgoing messages (205). In particular embodiments, the notification manager process may select one or more of the one or more outgoing messages based on respective values of the one or more outgoing messages. In particular embodiments, the notification manager process may transmit the selected one or more outgoing messages to the mobile device. For example, the notification manager process can select outgoing messages with priority scores greater than a pre-determined threshold (e.g., 0.6), and transmit the selected messages to the first user's mobile device. The notification manger process may adjust the threshold based on the mobile device's power state. For example, the notification manager process can transmit to the mobile device only high priority messages (e.g., by using a high threshold value such as 0.8) if the mobile device's battery level is low (e.g., less than 20% charged) to extend battery life. For example, the notification manager process can transmit most of the outgoing messages to the mobile device by using a lower threshold value (e.g., 0.4) if the mobile device's battery level is high (e.g., greater than 80% charged) or the mobile device's battery is currently being charged. In one embodiment, the notification manager process may transmit all of the outgoing messages to the mobile device if the mobile device's battery level is high or the mobile device's battery is currently being charged.

In addition to transmitting to the mobile device outgoing messages with highest priority scores, particular embodiments may store one or more remaining outgoing messages in a queue and transmit to the mobile device at a later time. In particular embodiments, the notification manager process may select and store in a queue one or more of the one or more outgoing messages based on the respective values of the one or more outgoing messages and the mobile device's power state. For example, the notification manager process may select outgoing messages with priority scores of less than 0.4 and store the selected messages in a queue if the mobile device's battery level is more than 80% charged or the mobile device's battery is currently being charged. For example, the notification manager process may select outgoing messages with priority scores of less than 0.8 and store the selected messages in a queue if the mobile device's battery level is less than 20% charged—i.e., the notification manager process may select and store more lower-priority messages in a queue if the mobile device's battery level is low.

In particular embodiments, the notification manager process may transmit at least one of the queued one or more outgoing messages to the mobile device at a later instance of time. For example, the notification manager process may transmit at least one of the queued one or more outgoing messages to the mobile device at a pre-determined time interval (e.g., every 30 minutes). For example, the notification manager process may transmit at least one of the queued one or more outgoing messages to the mobile device when a size of the queue is greater than a pre-determined threshold (e.g., when the queue has more than 30 queued messages). For example, the notification manager process may transmit at least one of the queued one or more outgoing messages to the mobile device when a real-time outgoing message (e.g., a phone call, a voice all) is transmitted to the mobile device. For example, the notification manager process may transmit at least one of the queued one or more outgoing messages to the mobile device when an high priority outgoing message (e.g., a message with a priority score greater than 0.9) is transmitted to the mobile device. By storing outgoing messages in a queue and transmitting the queued messages (with or without other high priority messages) to the mobile device at a later instance of time in a same wireless communication session ("piggybacking"), the effective transmit cost for each message (e.g., in energy consumption) can be lower since multiple messages share a same energy consumption cost for establishing the same wireless communication session.

In some embodiments, the notification manager process may transmit at least one of the queued one or more outgoing messages to the mobile device when the mobile device's power state and/or radio network state change. For example, the first user may connect the mobile device to a wall power outlet (via a battery charging cable), causing a background process running on one or more processors of the mobile device to transmit to the social networking system a message indicating a new power state (that the mobile device's battery is currently being charged). In response to the message, the notification manager process can transmit all queued outgoing messages to the mobile device, since the mobile device is no longer energy constrained. For example, the wireless communication subsystem of the mobile device may switch from a GSM network to a WI-FI network, causing a background process running on one or more processors of the mobile device to transmit to the social networking system a message indicating a new radio network state (i.e., the WI-FI network connection). In response to the message, the notification manager process can transmit all queued outgoing messages to the mobile device, since the mobile device is no longer bandwidth constrained. For example, the wireless communication subsystem of the mobile device may switch to a low-bandwidth network (e.g., second generation or 2G cellular network) or detect a weak signal strength of a wireless connection (e.g., 1 out of 5 bars), causing a background process running on one or more processors of the mobile device to transmit to the social networking system a message indicating a new radio network state (e.g., a 2G connection, or weak signal strength). In response to the message, the notification manager process can transmit only higher-priority messages (e.g., outgoing messages with priority scores of greater than 0.8) to the mobile device, in order to extend battery life.

Particular embodiments may transmit one or more outgoing messages to the mobile device based on the first user's location data. In particular embodiments, the notification manager process may access one or more data stores (e.g., location database 104) for the first user's location data. In particular embodiments, the notification manager process may transmit at least one of the one or more outgoing messages further based on the first user's location. For example, the notification manager process can transmit all outgoing messages to the first user's mobile device regardless the mobile device's battery level, if the first user is at or near a location where the first user can charge the mobile device (e.g., a location with easy access to a power outlet). A location where the first user can charge the mobile device can be a known location (e.g., home, work). A location where the first user can charge the mobile device can be a recorded location where the first user has charged the mobile device before. For example, the notification manager process or a server-side process of the social networking system can store (e.g., in location database 104) one or more locations wherein the mobile device has been charged (e.g., based on one or more power states transmitted from the mobile device).

Particular embodiments may access one or more data stores (e.g., event database 102) for the first user's current or future activities, and transmit one or more outgoing messages to the mobile device based on the first user's current or future activities. For example, the notification manager process may store a majority of outgoing messages in a queue to conserve the mobile device's battery level if the first user is going to an event (or is at an event) where the first user does not access to a power outlet for an extended period of time (e.g., 5 hours).

Particular embodiments may transmit one or more outgoing messages to the mobile device based on the first user's interaction with the mobile device. For example, the wireless communication subsystem of the mobile device may determine that the first user is using the mobile device for a real-time communication session (e.g., a phone call, a voice call), causing a background process running on one or more processors to send to the social networking system a message indicating the mobile device being used for a real-time communication session. In response to the message, the notification manager process can transmit to the mobile device only very high ranking messages (e.g., outgoing messages with priority scores of greater than 0.9) to the mobile device, in order to minimize the risk of disrupting the real-time communication session (e.g., causing the phone call being dropped).

Figure 3:
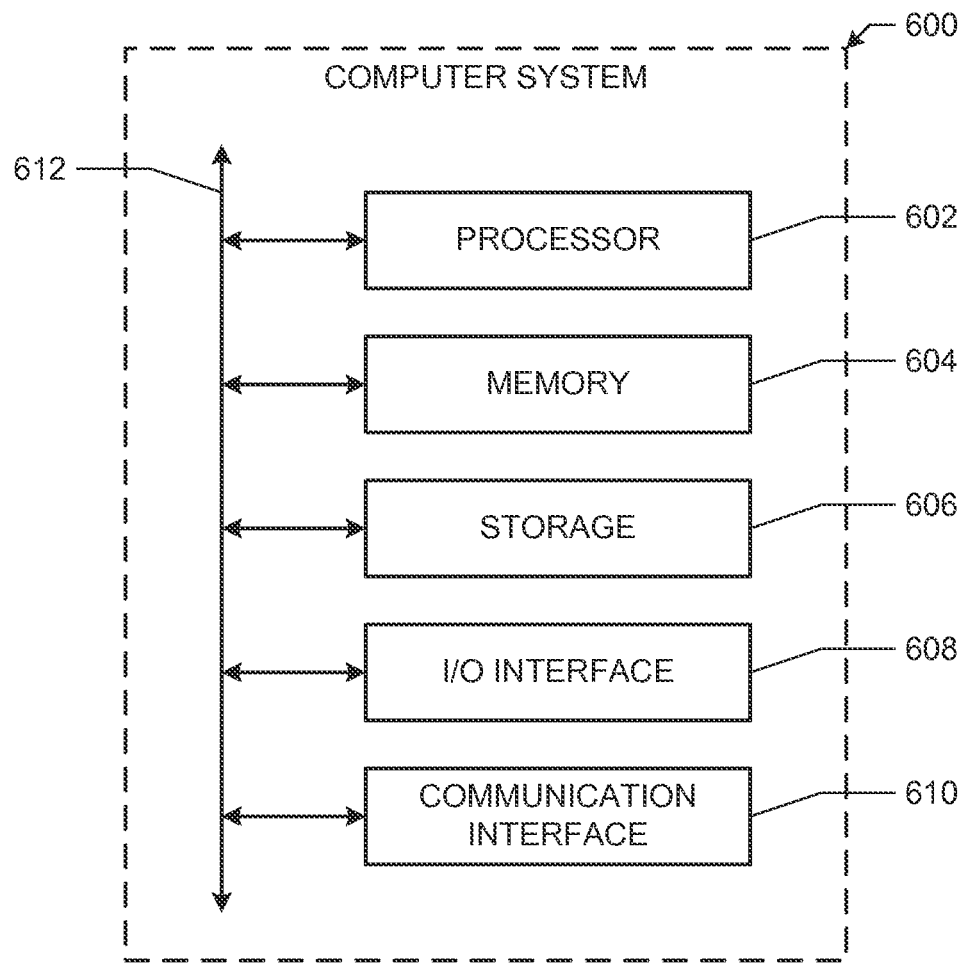
FIG. 3 illustrates an example computer system.

FIG. 3 illustrates an example computer system 600. This disclosure contemplates any suitable number of computer systems 600. This disclosure contemplates computer system 600 taking any suitable physical form. As example and not by way of limitation, computer system 600 may be an embedded computer system, a system-on-chip (SOC), a desktop computer system, a mobile computer system, a game console, a mainframe, a mesh of computer systems, a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be maskprogrammed ROM, programmable ROM (PROM), erasable PROM (EPROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network (e.g., a 802.11a/b/g/n WI-FI network,), a WI-MAX network, a cellular telephone network (e.g., a Global System for Mobile Communications (GSM) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Degital (SD) memory interface, a Secure Digital Input Output (SDIO) interface, a Universal Serial Bus (USB) bus, a General Purpose Input/Output (GPIO) bus, or another suitable bus or a combination of two or more of these. Bus 612 may include one or more buses 612, where appropriate.

Figure 4:
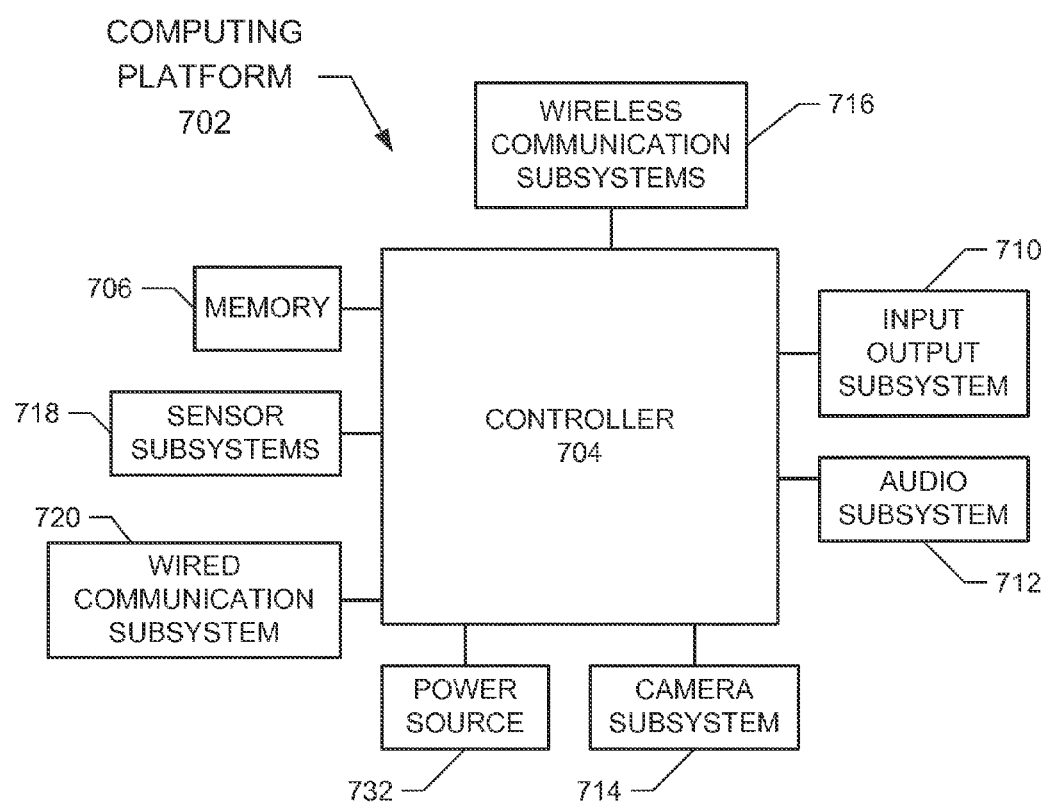
FIG. 4 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 4 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, and/or, display (e.g., liquid crystal display (LCD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (e.g., a BLUETOOTH), a WI-FI network (e.g., an 802.11a/b/g/n network), a WI-MAX network, a cellular telephone network (such as, for example, a Global System for Mobile Communications (GSM) network, a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Degital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these. Additionally, computing platform 702 may be powered by power source 732.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of a social-networking system:
   receiving, from a mobile device of a first user, an indication of a radio-network state of the mobile device of the first user;
   identifying a plurality of messages to be sent to the mobile device of the first user from one or more mobile devices each associated with second user, each of the plurality of messages having a message size;
   determining, for each message of the plurality of messages, a transmit cost of the message based at least in part on the radio-network state of the mobile device of the first user and the message size of the message, and a value of the message;

determining a priority score for each message of the plurality of messages based at least in part on the transmit cost and the value of each of the messages; and transmitting at least one message of the plurality of messages to the mobile device of the first user based at least in part on the priority score associated with the message.

2. The method of claim 1, wherein the determining of the value of each of the messages is based at least in part on determining an affinity between the first user and each of the second users.

3. The method of claim 2, wherein the first user and each of the second users are users of the social-networking system,
wherein the social-networking system comprises a social graph that comprises a plurality of nodes and a plurality of edges connecting the nodes, each of the edges between two of the nodes representing a single degree of separation between the nodes, and
wherein the first user is associated with a first node of the social graph, the second users are each associated with a second node of a plurality of second nodes of the social graph, and the first node and each of the plurality of second nodes are connected by at least one edge of the social graph.

4. The method of claim 3, wherein the affinity between the first user and each of the second users is determined based on a number of degrees of separation between the first node associated with the first user and the second node associated with each of the second users.

5. The method of claim 4, further comprising:
assigning an affinity coefficient to each of the plurality of messages based on the number of degrees of separation between the first node of the first user and the second node of the second user associated with each of the messages,
wherein the transmitting of the at least one of the messages to the mobile device of the first user is based at least in part on the affinity coefficient of the message being equal to or more than a predetermined affinity coefficient.

6. The method of claim 5, wherein the determining of the value of each of the messages is further based at least in part on determining a type of each message, and
wherein the priority score for each message of the plurality of messages is further based at least in part on the type of the message.

7. The method of claim 1, wherein the radio-network state of the mobile device of the first user comprises:
a radio network that the mobile device of the first user is connected to;
a signal strength of the connection; or
a bandwidth of the connection.

8. The method of claim 1, wherein, for each of the messages, the transmit cost is based at least in part on a first energy-consumption number that is based at least in part on:
a radio power-consumption number that is based at least in part on:
a radio network that the mobile device of the first user is connected to; and
the mobile device of the first user;
the size of the message; and
a bandwidth of the connection of the mobile device of the first user to the radio network.

9. The method of claim 8, wherein the transmit cost of the message is further based at least in part on a second energy-consumption number that is based at least in part on:
the radio power-consumption number; and
a time duration of establishing a communication session to send the message to the mobile device of the first user.

10. One or more computer-readable non-transitory storage media embodying software that is operable when executed to:
receive, from a mobile device of a first user, an indication of a radio-network state of the mobile device of the first user;
identify a plurality of messages to be sent to the mobile device of the first user from one or more mobile devices each associated with a second user, each of the plurality of messages having a message size;
determine, for each message of the plurality of messages, a transmit cost of the message based at least in part on the radio-network state of the mobile device of the first user and the message size of the message, and a value of the message;
determine a priority score for each message of the plurality of messages based at least in part on the transmit cost and the value of each of the messages; and
transmit at least one message of the plurality of messages to the mobile device of the first user based at least in part on the priority score associated with the message.

11. The media of claim 10, wherein the determining of the value of each of the messages is based at least in part on determining an affinity between the first user and each of the one or more second users.

12. The media of claim 11, wherein the first user and each of the second users are users of a social-networking system,
wherein the social-networking system comprises a social graph that comprises a plurality of nodes and a plurality of edges connecting the nodes, each of the edges between two of the nodes representing a single degree of separation between the nodes, and
wherein the first user is associated with a first node of the social graph, the second users are each associated with a second node of a plurality of second nodes of the social graph, and the first node and each of the plurality of second nodes are connected by at least one edge of the social graph.

13. The media of claim 12, wherein the affinity between the first user and each of the one or more second users is determined based on a number of degrees of separation between the first node of the first user and the second node of each of the one or more second users.

14. The media of claim 13, wherein the computer-readable non-transitory storage media is further executed to:
assign an affinity coefficient to each of the plurality of messages based on the number of degrees of separation between the first node of the first user and the second node of the second user associated with each of the messages,
wherein the transmitting of the at least one of the messages to the mobile device of the first user is based at least in part on the affinity coefficient of the message being equal to or more than a predetermined affinity coefficient.

15. The media of claim 14, wherein the determining of the value of each of the messages is further based at least in part on determining a type of each message of the plurality of messages, and
wherein the priority score for each message of the plurality of messages is further based at least in part on the type of the message.

16. The media of claim 10, wherein the radio-network state of the mobile device of the first user comprises:
a radio network that the mobile device of the first user is connected to;
a signal strength of the connection; or
a bandwidth of the connection.

17. The media of claim 10, wherein, for each of the messages, the transmit cost is based at least in part on a first energy-consumption number that is based at least in part on:
   a radio power-consumption number that is based at least in part on:
      a radio network that the mobile device of the first user is connected to; and
      the mobile device of the first user;
   the size of the message; and
   a bandwidth of the connection of the mobile device of the first user to the radio network.

18. The media of claim 17, wherein the transmit cost of the message is further based at least in part on a second energy-consumption number that is based at least in part on:
   the radio power-consumption number; and
   a time duration of establishing a communication session to send the message to the mobile device of the first user.

19. A system comprising: one or more processors; and a non-transitory memory coupled to the processors comprising instructions executable by the processors, the processors operable when executing the instructions to:
   receive, from a mobile device of a first user, an indication of a radio-network state of the mobile device of the first user;
   identify a plurality of messages to be sent to the mobile device of the first user from one or more mobile devices each associated with a second user, each of the plurality of messages having a message size;
   determine, for each message of the plurality of messages,
      a transmit cost of the message based at least in part on the radio-network state of the mobile device of the first user and the message size of the message, and
      a value of the message;
   determine a priority score for each message of the plurality of messages based at least in part on the transmit cost and the value of each of the messages; and
   transmit at least one message of the plurality of messages to the mobile device of the first user based at least in part on the priority score associated with the message.

20. The system of claim 19, wherein the determining of the value of each of the messages is based at least in part on determining an affinity between the first user and each of the one or more second users,
   wherein the first user and each of the second users are users of a social-networking system,
   wherein the social-networking system comprises a social graph that comprises a plurality of nodes and a plurality of edges connecting the nodes, each of the edges between two of the nodes representing a single degree of separation between the nodes, and
   wherein the first user is associated with a first node of the social graph, the second users are each associated with a second node of a plurality of second nodes of the social graph, and the first node and each of the plurality of second nodes are connected by at least one edge of the social graph.

* * * * *